(12) United States Patent
Yuan

(10) Patent No.: US 10,121,337 B2
(45) Date of Patent: Nov. 6, 2018

(54) GAZE CONTROLLED BIT RATE

(71) Applicant: Axis AB, Lund (SE)

(72) Inventor: Song Yuan, S Sandby (SE)

(73) Assignee: AXIS AB, Lund (SE)

( * ) Notice: Subject to any disclaimer, the term of this patent is extended or adjusted under 35 U.S.C. 154(b) by 189 days.

(21) Appl. No.: 15/395,856

(22) Filed: Dec. 30, 2016

(65) Prior Publication Data

US 2018/0190091 A1    Jul. 5, 2018

(51) Int. Cl.
| | |
|---|---|
| *G08B 13/196* | (2006.01) |
| *H04N 19/115* | (2014.01) |
| *H04N 19/162* | (2014.01) |
| *H04N 19/17* | (2014.01) |
| *H04N 19/167* | (2014.01) |
| *H04N 7/18* | (2006.01) |
| *H04N 21/422* | (2011.01) |
| *H04N 21/4402* | (2011.01) |
| *H04N 19/132* | (2014.01) |
| *H04N 19/40* | (2014.01) |

(52) U.S. Cl.
CPC .  *G08B 13/19693* (2013.01); *G08B 13/19682* (2013.01); *H04N 7/181* (2013.01); *H04N 19/115* (2014.11); *H04N 19/162* (2014.11); *H04N 19/167* (2014.11); *H04N 19/17* (2014.11); *H04N 21/42222* (2013.01); *H04N 21/440281* (2013.01); *H04N 19/132* (2014.11); *H04N 19/40* (2014.11)

(58) Field of Classification Search
CPC ........ G08B 13/19693; G08B 13/19682; H04N 19/115; H04N 19/162; H04N 19/167; H04N 19/17; H04N 19/132; H04N 19/40; H04N 7/181; H04N 21/440281
See application file for complete search history.

(56) References Cited

U.S. PATENT DOCUMENTS

| | | | |
|---|---|---|---|
| 4,513,317 A | 4/1985 | Ruoff, Jr. | |
| 5,703,637 A | 12/1997 | Miyazaki et al. | |
| 6,717,607 B1 | 4/2004 | Lauper et al. | |
| 7,068,813 B2 * | 6/2006 | Lin | G06F 3/013 351/209 |
| 8,493,390 B2 * | 7/2013 | Kalinli | G06F 3/1415 345/428 |

(Continued)

FOREIGN PATENT DOCUMENTS

EP    2 838 268 A1    2/2015

OTHER PUBLICATIONS

"This is Eye Tracking," Tobii Group, <http://www.tobii.com/group/about/this-is-eye-tracking/>, accessed Dec. 29, 2016.

(Continued)

*Primary Examiner* — Nhon T Diep
(74) *Attorney, Agent, or Firm* — Snyder, Clark, Lesch & Chung, LLP

(57) ABSTRACT

A method may include receiving a video stream from a camera and displaying the video stream on a display. The method may further include obtaining, via an eye tracking sensor, information identifying a gaze area for a user watching the display; generating a gradient from the gaze area to edges of the display; and instructing the camera to decrease a bit rate of the video stream outside the gaze area based on the generated gradient.

20 Claims, 10 Drawing Sheets

(56) References Cited

U.S. PATENT DOCUMENTS

| | | | |
|---|---|---|---|
| 9,041,787 B2* | 5/2015 | Andersson | G06F 3/013 348/77 |
| 2004/0103111 A1* | 5/2004 | Miller | G02B 27/017 |
| 2005/0018911 A1 | 1/2005 | Deever | |
| 2007/0074266 A1 | 3/2007 | Raveendran et al. | |
| 2012/0146891 A1 | 6/2012 | Kalinli | |
| 2015/0036736 A1 | 2/2015 | Lundberg | |
| 2018/0004289 A1* | 1/2018 | Wilson | G06F 3/14 |

OTHER PUBLICATIONS

Robillard, Julie, "How to Create a Heatmap," Gazepoint, <http://www.gazept.com/faq-items/heatmap/>, Jan. 1, 2014, accessed Dec. 29, 2016.

"Video compression picture types," Wikipedia, <https://en.wikipedia.org/wiki/Video_compression_picture_types>, accessed Dec. 29, 2016.

Reeves T. H. et al.: "Adaptive foveation of MPEG video", Proceedings of ACM Multimedia 96. Boston, Nov. 18-22, 1996; [Proceedings of ACM Multimedia], New York, ACM, US, Feb. 1, 1997 (Feb. 1, 1997), pp. 231-241.

* cited by examiner

GAZE CONTROLLED BIT RATE

BACKGROUND

A monitoring device, such as a camera, may be installed to capture images or video of an area of interest. A user, or a group of users, may monitor images or video from the camera on a display that is located remotely from the camera. The data captured by the camera may be processed and sent over a network connection to the display. For example, the images or video may be compressed in order to reduce the amount of data that has to be transmitted across a network. A system may include a large number of cameras transmitting a large amount of data across a network. The large amount of data may tax the resources of the network.

SUMMARY

According to one aspect, a method, performed by a computer device, may include receiving a video stream from a camera; displaying the video stream on a display; obtaining, via an eye tracking sensor, information identifying a gaze area for a user watching the display; generating a gradient from the gaze area towards edges of the display; and instructing the camera to decrease a bit rate of the video stream outside the gaze area based on the generated gradient.

Additionally, the method may include calculating a predicted gaze trajectory based on the obtained information; and increasing the bit rate of the video stream along the predicted gaze trajectory.

Additionally, the method may further include determining that the gaze area falls outside the display; and decreasing the bit rate for the entire video stream, in response to determining that the gaze area falls outside the display.

Additionally, the method may further include detecting a moving object in the video stream outside the gaze area; and correlating the gaze area to the moving object.

Additionally, generating the gradient from the gaze area to edges of the display may include defining a first bit rate reduction factor for a first region from an edge of the gaze area to a particular distance from the edge of the gaze area, wherein the first bit rate reduction factor indicates an extent by which a bit rate for the first region is reduced; and defining a second bit rate reduction factor for a second region from the particular distance to the edges of the display, wherein the second bit rate reduction factor indicates an extent by which a bit rate for the second region is reduced, wherein the second bit rate reduction factor is higher than the first bit rate reduction factor.

Additionally, generating the gradient from the gaze area to edges of the display may further include defining a linearly decreasing bit rate reduction factor from an edge of the gaze area towards the edges of the display, wherein the bit rate reduction factor at a particular location of the display indicates an extent by which a bit rate at the particular location is reduced.

Additionally, instructing the camera to decrease a bit rate of the video stream outside the gaze area based on the generated gradient may further include instructing the camera to reduce a sampling rate for a sensor associated with an area of the video stream outside the gaze area.

Additionally, instructing the camera to decrease a bit rate of the video stream outside the gaze area based on the generated gradient may further include instructing the camera to lower resolution for an area of the video stream outside the gaze area prior to encoding the video stream.

Additionally, instructing the camera to decrease a bit rate of the video stream outside the gaze area based on the generated gradient may further include instructing the camera to increase a noise reduction process for an area of the video stream outside the gaze area prior to encoding the video stream.

Additionally, instructing the camera to decrease a bit rate of the video stream outside the gaze area based on the generated gradient may further include instructing the camera to increase a compression parameter value for an encoding processing unit associated with an area of the video stream outside the gaze area.

Additionally, the video stream may include a plurality of video streams and the display may include a plurality of displays.

According to another aspect, a computer device may include a memory storing instructions; and a processor configured to execute the instructions to receive a video stream from a camera; display the video stream on a display; obtain, via an eye tracking sensor, information identifying a gaze area for a user watching the display; generate a gradient from the gaze area to edges of the display; and instruct the camera to decrease a bit rate of the video stream outside the gaze area based on the generated gradient.

Additionally, the processor may be further configured to execute the instructions to calculate a predicted gaze trajectory based on the obtained gaze information; and increase the bit rate of the video stream along the predicted gaze trajectory.

Additionally, when generating the gradient from the gaze area to edges of the display, the processor may be further configured to define a first bit rate reduction factor for a first region from an edge of the gaze area to a particular distance from the edge of the gaze area, wherein the first bit rate reduction factor indicates an extent by which a bit rate for the first region is reduced; and define a second bit rate reduction factor for a second region from the particular distance towards the edges of the display, wherein the second bit rate reduction factor indicates an extent by which a bit rate for the second region is reduced, wherein the second bit rate reduction factor is higher than the first bit rate reduction factor.

Additionally, when generating the gradient from the gaze area to edges of the display, the processor may be further configured to define a linearly decreasing bit rate reduction factor from an edge of the gaze area towards the edges of the display, wherein the bit rate reduction factor at a particular location of the display indicates an extent by which a bit rate at the particular location is reduced.

Additionally, when instructing the camera to decrease a bit rate of the video stream outside the gaze area based on the generated gradient, the processor may be further configured to instruct the camera to reduce a sampling rate for a sensor associated with an area of the video stream outside the gaze area.

Additionally, when instructing the camera to decrease a bit rate of the video stream outside the gaze area based on the generated gradient, the processor may be further configured to instruct the camera to lower resolution for an area of the video stream outside the gaze area prior to encoding the video stream.

Additionally, when instructing the camera to decrease a bit rate of the video stream outside the gaze area based on the generated gradient, the processor may be further configured to instruct the camera to increase a noise reduction process for an area of the video stream outside the gaze area prior to encoding the video stream.

Additionally, when instructing the camera to decrease a bit rate of the video stream outside the gaze area based on the generated gradient, the processor may be further configured to instruct the camera to increase a compression parameter value for an encoding processing unit associated with an area of the video stream outside the gaze area.

According to yet another aspect, a system may include a camera configured to generate a video stream; and a computer device configured to receive the video stream from the camera; display the video stream on a display; obtain, via an eye tracking sensor, information identifying a gaze area for a user watching the display; generate a gradient from the gaze area to edges of the display; and send an instruction to the camera to decrease a bit rate of the video stream outside the gaze area based on the generated gradient; and wherein the camera is further configured to decrease the bit rate of the video stream outside the gaze area based on the received instruction.

DETAILED DESCRIPTION OF PREFERRED EMBODIMENTS

Figure 1:
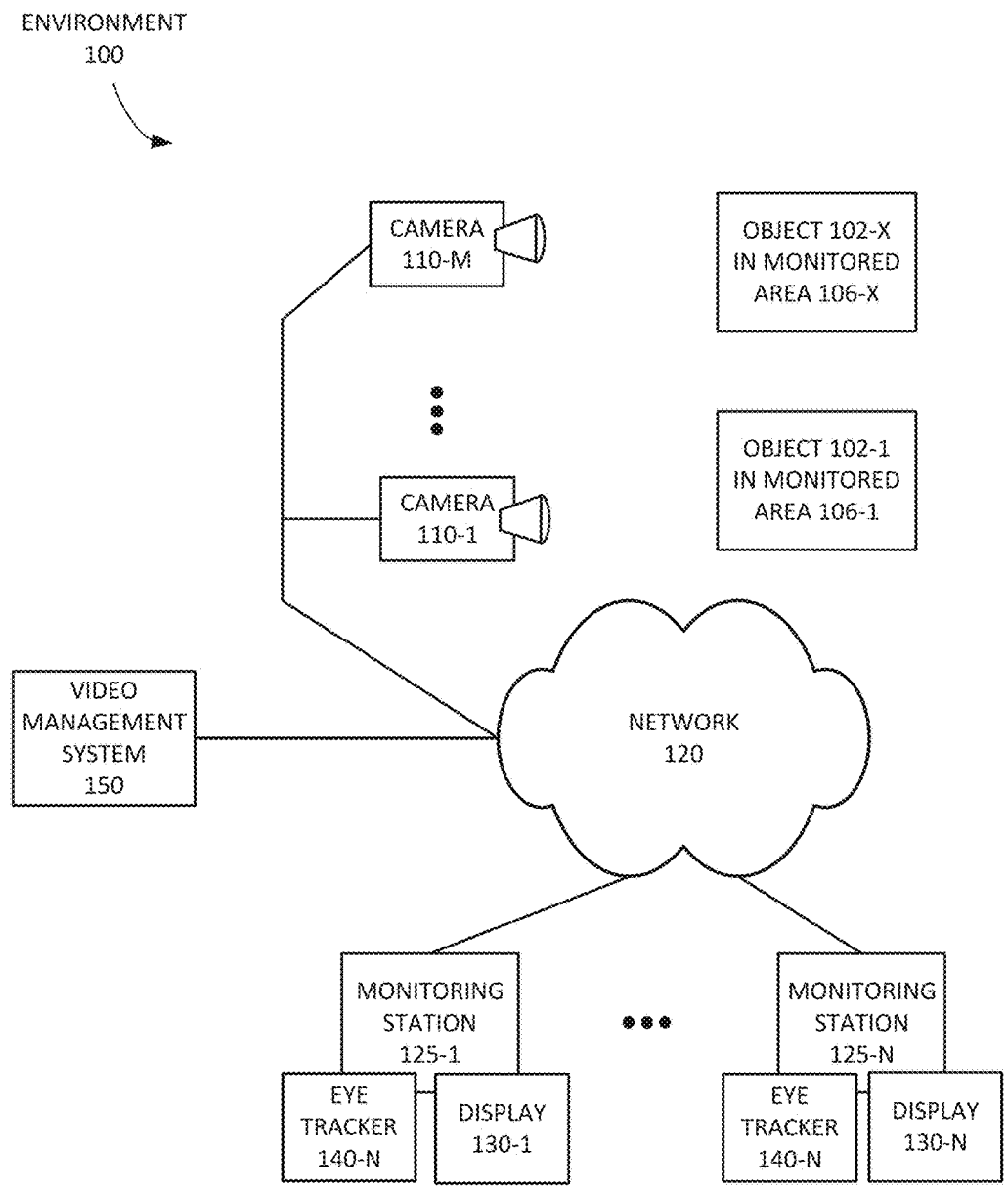
FIG. 1 is a block diagram illustrating an exemplary environment including eye tracking according to an implementation described herein.

The following detailed description refers to the accompanying drawings. The same reference numbers in different drawings identify the same or similar elements.

Implementations described herein relate to a gaze controlled bit rate. A monitoring camera streams video of an area of interest to a display. Video streams may have high bandwidth requirements and may consume significant network bandwidth. Furthermore, processing a video stream may require processor and memory resources. A person watching the display, referred to herein as an "operator" or "user," may only be able to watch a portion of the display at any given time. Furthermore, the operator may be tasked with watching multiple displays from multiple cameras and can only direct his or her gaze at a single display at a time. An eye tracker may be used to identify the operator's gaze area and therefore to identify a portion of the display, or one or more displays in a group of displays, at which the operator is not looking. Reducing the bit rate of a video stream in a portion of the video stream at which the operator is not looking may therefore result in the technical effect of conserving network resources and reducing processor and memory load for a monitoring system of cameras and monitoring stations.

A video management system may manage a client device that includes a display. The display may receive a video stream from a camera and display the video stream on the display. The video management system may obtain, via an eye tracking sensor, information identifying a gaze area for a user watching the display, generate a gradient from the gaze area to edges of the display, and instruct the camera to decrease a bit rate of the video stream outside the gaze area based on the generated gradient. In some implementations, the video stream may include multiple video streams and the display may include multiple displays.

The gradient may be defined by one or more bit rate reduction factors. A bit rate reduction factor for a region of a video stream may indicate an extent by which a bit rate for the region is reduced compared to a bit rate for the region without applied bit reduction. As an example, generating the gradient may include defining a first bit rate reduction factor for a first region from an edge of the gaze area to a set distance from the edge of the gaze area, and defining a second bit rate reduction factor, higher than the first bit rate reduction factor, for a second region from the set distance to the edges of the display. As another example, generating the gradient may include defining a linearly decreasing bit rate reduction factor from an edge of the gaze area to the edges of the display. As yet another example, generating the gradient may include determining that the gaze area falls outside the display and decreasing the bit rate for the entire video stream, in response to determining that the gaze area falls outside the display. As yet another example, generating the gradient may include instructing the camera to increase a bit rate of the video stream inside the gaze area.

Bit rate reduction factors may be used to define bit rate reductions rather than actual bit rate values, because actual bit rates may not be predictable. The actual bit rates may depend on the amount of compression that is achievable for a particular video stream based on the properties of the video stream. Thus, in practice, it may occur in particular situations that a first region with a high bit rate reduction factor will result in a higher bit rate than a second region with no bit rate reduction or a low bit rate reduction factor, because the image data in the first region may be more compressible (e.g., because of intra-frame compression).

The video management system may perform other adjustments to a bit rate for a region of the video stream. As an example, a predicted gaze trajectory may be calculated based on a movement of the gaze area and a bit rate may be increased along the predicted gaze trajectory. As another example, a moving object may be detected in the video stream and the gaze area may be correlated to the moving object. If the gaze area starts to move toward the moving object, the bit rate reduction factor associated with the moving object may be decreased.

The bit rate may be reduced at any of a number of points along a processing path from the point of capture of the video data by a sensor array to transmitting an encoded video stream to the display via a network connection. As an example, instructing the camera to decrease the bit rate of the video stream outside the gaze area may include instructing the camera to reduce a sampling rate for a sensor associated with an area of the video stream outside the gaze area. As another example, instructing the camera to decrease the bit rate of the video stream outside the gaze area may include instructing the camera to lower resolution for an area of the video stream outside the gaze area prior to encoding the video stream. As yet another example, instructing the camera to decrease the bit rate of the video stream outside the gaze area may include instructing the camera to increase a noise reduction process for an area of the video stream outside the gaze area prior to encoding the video stream. As yet another example, instructing the camera to decrease the bit rate of the video stream outside the gaze area may include instructing the camera to increase a compression parameter value for an encoding processing unit associated with an area of the video stream outside the gaze area.

FIG. 1 is a block diagram illustrating an exemplary environment 100 in an embodiment. Environment 100 may be, for example, a monitoring system to secure an area or provide public safety. As shown in FIG. 1, environment 100 may include cameras 110-1 through 110-M, network 120, monitoring stations 125-1 through 125-N, displays 130-1 through 130-N, eye trackers 140-1 through 140-N, and/or a video management system (VMS) 150.

Cameras 110-1 through 110-M (individually "camera 110," or collectively "cameras 110") capture images and/or video of monitored areas 106. A monitored area 106 may be monitored by one or more cameras 110. For example, two cameras can monitor area 106-1, which includes an object 102-1. Objects 102 may include any object, such as a door, a person, an animal, a vehicle, a license plate on a vehicle, etc.

Camera 110 may capture image data using visible light, infrared light, and/or other non-visible electromagnetic radiation (e.g., ultraviolet light, far infrared light, terahertz radiation, microwave radiation, etc.). Camera 110 may include a thermal camera and/or a radar device for radar imaging. The captured image data may include a continuous image sequence (e.g., video), a limited image sequence, still images, and/or a combination thereof. Camera 110 may include a digital camera for capturing and digitizing images and/or an analog camera for capturing images and storing image data in an analog format.

Camera 110 may include sensors that generate data arranged in one or more two-dimensional array(s) (e.g., image data or video data). As used herein, "video data" and "video" may be referred to more generally as "image data" and "image," respectively. Thus, "image data" or an "image" is meant to include "video data" and "videos" unless stated otherwise. Likewise, "video data" or a "video" may include a still image unless stated otherwise. Furthermore, in some implementations, "video data" may include audio data.

Monitoring stations 125-1 through 125- may include computer devices that are clients of VMS 150 and that are coupled to displays 130-1 through 130-N (individually "monitoring station 125" and "display 130," respectively). In an embodiment, monitoring stations 125-1 through 125-N are also coupled to eye trackers 140-1 through 140-N (individually "eye tracker 140"). Monitoring station 125 and display 130 enable operators (not shown in FIG. 1) to view images from cameras 110. Eye tracker 140 tracks the gaze of an operator viewing display 130. Each monitoring station 125, display 130, and eye tracker 140 may be a "client" for an operator to interact with the monitoring system shown in environment 100.

Display 130 receives and displays video stream(s) from one or more cameras 110. A single display 130 may show images from a single camera 110 or from multiple cameras 110 (e.g., in multiple frames or windows on display 130). A single display 130 may also show images from a single camera but in different frames. That is, a single camera may include a wide-angle or fisheye lens, for example, and provide images of multiple areas 106. Images from the different areas 106 may be separated and shown on display 130 separately in different windows and/or frames. Display 130 may include a liquid-crystal display (LCD), a light-emitting diode (LED) display, an organic LED (OLED) display, a cathode ray tube (CRT) display, a plasma display, a laser video display, an electrophoretic display, a quantum dot display, a video projector, and/or any other type of display device.

Eye tracker 140 includes a sensor (e.g., a camera) that enables VMS 150 (or any other device in environment 100) to determine where the eyes of an operator are focused. For example, a set of near-infrared light beams may be directed at an operator's eyes, causing reflections in the operator's corneas. The reflections may be tracked by a camera included in eye tracker 140 to determine the operator's gaze area. The gaze area may include a gaze point and an area of foveal focus. For example, an operator may sit in front of display 130 of monitoring station 125. Eye tracker 140 determines which portion of display 130 the operator is focusing on. Each display 130 may be associated with a single eye tracker 140. Alternatively, an eye tracker 140 may correspond to multiple displays 130. In this case, eye tracker 140 may determine which display and/or which portion of that display 130 the operator is focusing on.

Eye tracker 140 may also determine the presence, a level of attention, focus, drowsiness, consciousness, and/or other states of a user. Eye tracker 140 may also determine the identity of a user. The information from eye tracker 140 can be used to gain insights into operator behavior over time or determine the operator's current state. In some implementations, display 130 and eye tracker 140 may be implemented in a virtual reality (VR) headset worn by an operator. The operator may perform a virtual inspection of area 106 using one or more cameras 110 as input into the VR headset.

Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

VMS 150 may include one or more computer devices, such as, for example, server devices, which coordinate operation of cameras 110, display devices 130, and/or eye tracking system 140. VMS 150 may receive and store image data from cameras 110. VMS 150 may also provide a user interface for operators of monitoring stations 125 to view image data stored in VMS 150 or image data streamed from cameras 110. VMS 150 may include a rule engine to conserve system resources by instructing cameras 110 to reduce a bit rate for a region that is outside the operator's gaze area.

In some embodiments, environment 100 does not include a separate VMS 150. Instead, the services provided by VMS 150 are provided by monitoring stations 125 (e.g., computer devices associated with displays 130) and/or cameras 110 themselves or in a distributed manner among the devices in environment 100. For example, cameras 110 may include a rule engine to conserve system resources by instructing cameras 110 to reduce a bit rate for a region that is outside the operator's gaze area. Similarly, VMS 150 may perform operations described as performed by camera 110.

Although FIG. 1 shows exemplary components of environment 100, in other implementations, environment 100 may include fewer components, different components, differently arranged components, or additional components than depicted in FIG. 1. Additionally or alternatively, any one device (or any group of devices) may perform functions described as performed by one or more other devices.

Figure 2:
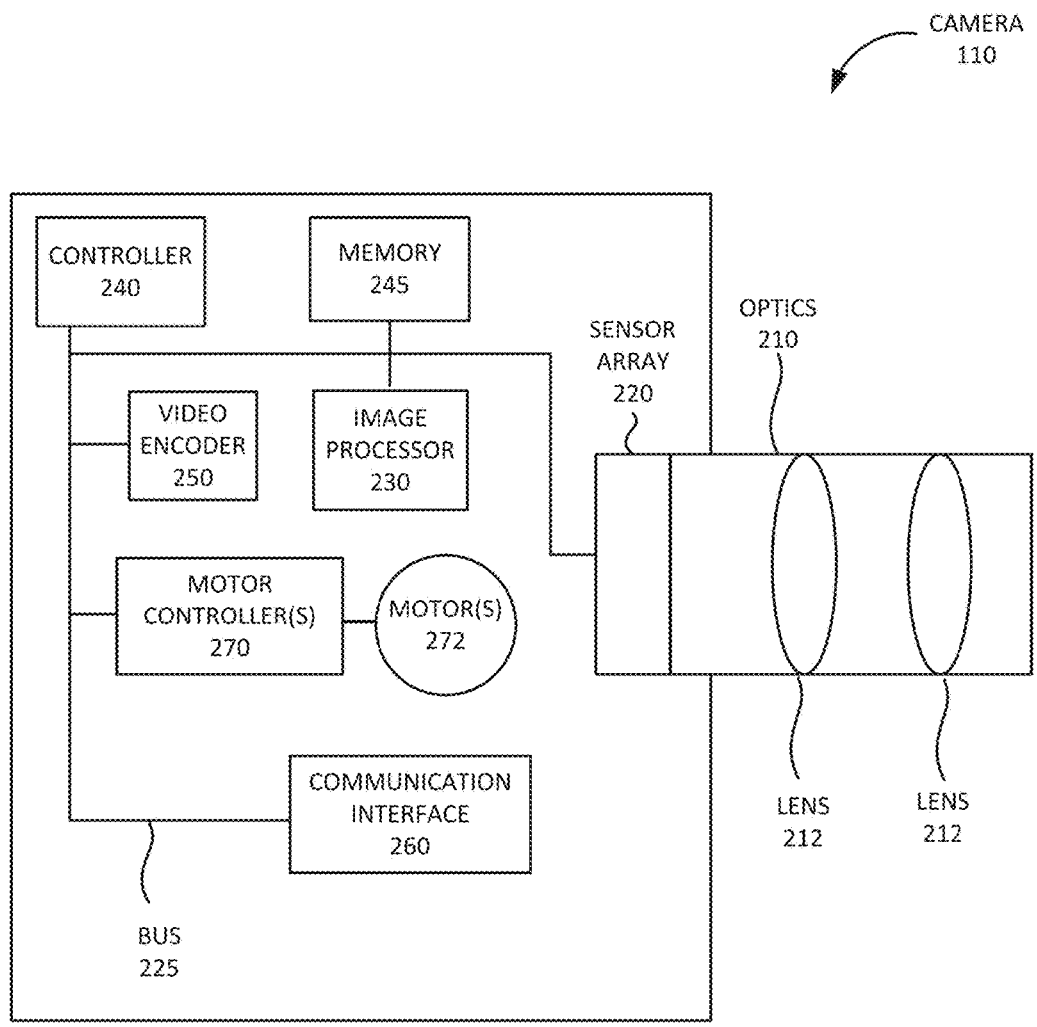
FIG. 2 is a block diagram illustrating exemplary components of a camera according to an implementation described herein.

FIG. 2 is a block diagram illustrating exemplary components of a camera 110 in an embodiment. As shown in FIG. 2, camera 110 may include an optics chain 210, a sensor array 220, a bus 225, an image processor 230, a controller 240, a memory 245, a video encoder 250, and/or a communication interface 260. In an embodiment, camera 110 may include one or more motor controllers 270 (e.g., three) and one or more motors 272 (e.g., three) for panning, tilting, rotating, and/or zooming camera 110.

Optics chain 210 includes an enclosure that directs incident radiation (e.g., light, visible light, infrared waves, millimeter waves, etc.) to a sensor array 220 to capture an image based on the incident radiation. Optics chain 210 includes one or more lenses 212 collect and focus the incident radiation from a monitored area onto sensor array 220.

Sensor array 220 may include an array of sensors for registering, sensing, and measuring radiation (e.g., light) incident or falling onto sensor array 220. The radiation may be in the visible light wavelength range, the infrared wavelength range, or other wavelength ranges.

Sensor array 220 may include, for example, a charged coupled device (CCD) array and/or an active pixel array (e.g., a complementary metal-oxide-semiconductor (CMOS) sensor array). Sensor array 220 may also include a microbolometer (e.g., when camera 110 includes a thermal camera or detector).

Sensor array 220 outputs data that is indicative of (e.g., describes properties or characteristics) the radiation (e.g., light) incident on sensor array 220. For example, the data output from sensor array 220 may include information such as the intensity of light (e.g., luminance), color, etc., incident on one or more pixels in sensor array 220. The light incident on sensor array 220 may be an "image" in that the light may be focused as a result of lenses in optics chain 210. In some implementations, controller 240 may reduce the bit rate associated with a particular region of sensor array 220 by turning off, and/or reduce a sampling rate, of a particular sensor, or a set of sensors, of sensor array 220.

Sensor array 220 can be considered an "image sensor" because it senses images falling on sensor array 220. As the term is used herein, an "image" includes the data indicative of the radiation (e.g., describing the properties or characteristics of the light) incident on sensor array 220. Accordingly, the term "image" may also be used to mean "image sensor data" or any data or data set describing an image. Further, a "pixel" may mean any region or area of sensor array 220 for which measurement(s) of radiation are taken (e.g., measurements that are indicative of the light incident on sensor array 220). A pixel may correspond to one or more (or less than one) sensor(s) in sensor array 220. In alternative embodiments, sensor array 220 may be a linear array that may use scanning hardware (e.g., a rotating mirror) to form images, or a non-array sensor which may rely upon image processor 230 and/or controller 240 to produce image sensor data.

Bus 225 includes a communication path that enables components in camera 110 to communicate with each other. Controller 240 and/or image processor 230 perform signal processing operations on image data captured by sensor array 220. For example, image processor 230 may perform image processing on images captured by sensor array 220, such as noise reduction, filtering, scaling, etc. Controller 240 may control the operation of camera 110 and may provide instructions to other components of camera 110, such as sensor array 220, image processor 230, video encoder 250, communication interface 260, and/or motor controller(s) 270.

Controller 240 and/or image processor 230 may include any type of single-core or multi-core processor, microprocessor, latch-based processor, and/or processing logic (or families of processors, microprocessors, and/or processing logics) that interpret and execute instructions. Controller 240 and/or image processor 230 may include or be coupled to a hardware accelerator, such as a graphics processing unit (GPU), a general purpose graphics processing unit (GPGPU), a Cell, a field programmable gate array (FPGA), an application specific integrated circuit (ASIC), and/or another type of integrated circuit or processing logic.

Controller 240 may also determine and control the desired focus and position (e.g., tilt, pan, rotation, zoom, etc.) of camera 110. To do so, controller 240 sends commands to one or more motor controllers 270 to drive one or more motors 272 to tilt, pan, rotate, and/or zoom camera 110 or optically zoom lenses 212.

Memory 245 may include any type of volatile and/or non-volatile storage device that stores information and/or instructions. Memory 245 may include a random access memory (RAM) or any type of dynamic storage device, a read-only memory (ROM) device or any type of static storage device, a magnetic or optical recording memory device and its corresponding drive, or a removable memory device. Memory 245 may store information and instructions (e.g., applications and/or an operating system) and data (e.g., application data) for use by processor camera 110. Memory 245 may store information identifying one or more bit rate reduction factors and/or particular sensor array capture, image processing, and/or encoding processes and/or parameters to which the one or more bit rate reduction factors are to be applied.

Memory 245 may store instructions for execution by controller 240, image processor 230, video encoder 250, and/or communication interface 260. The software instructions may be read into memory 245 from another computer-readable medium or from another device. The software instructions may cause controller 240, image processor 230, video encoder 250, and/or communication interface 260 to perform processes described herein. For example, camera 110 may perform operations relating to the image processing (e.g., encoding, noise reduction, transcoding, detecting objects, etc.) in response to controller 240, image processor 230, and/or video encoder 250 executing software instructions stored in memory 245. Alternatively, hardwired circuitry (e.g., logic) may be used in place of, or in combination with, software instructions to implement processes described herein.

Video encoder 250 may compress video data based on one or more video codecs, such as an H.262/Moving Pictures Experts Group (MPEG)-2 codec, an H.263/MPEG-2 Part 2 codec, an H.264/MPEG-4 codec, an H.265/MPEG-H High Efficiency Video Coding (HVEC) codec, and/or another type of codec.

Communication interface 260 includes circuitry and logic circuitry that includes input and/or output ports, input and/or output systems, and/or other input and output components that facilitate the transmission of data to another device. For example, communication interface 340 may include a network interface card (e.g., Ethernet card) for wired communications or a wireless network interface (e.g., a Long Term Evolution (LTE), WiFi, Bluetooth, etc.) card for wireless communications.

Although FIG. 2 shows exemplary components of camera 110, in other implementations, camera 110 may include fewer components, different components, differently arranged components, or additional components than depicted in FIG. 2. Additionally or alternatively, one or more components of camera 110 may perform functions described as performed by one or more other components of camera 110. For example, controller 240 may perform functions described as performed by image processor 230 and vice versa. Alternatively or additionally, camera 110 may include a computing module as described below with respect to FIG. 3.

Figure 3:
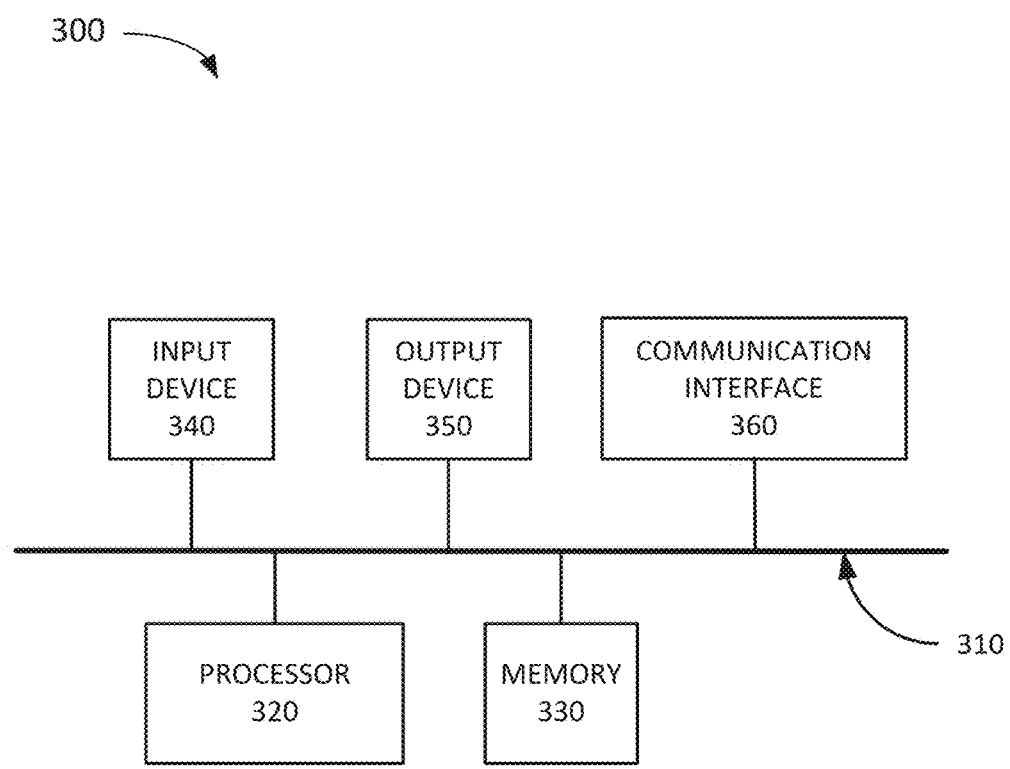
FIG. 3 is a block diagram illustrating exemplary components of a computing module according to an implementation described herein.

FIG. 3 is a block diagram illustrating exemplary components of a computing module 300 in an embodiment. Devices such as VMS 150, eye-tracking system 140, monitoring stations 125, and/or display devices 130 may include one or more computing modules 300. As shown in FIG. 3, computing module 300 may include a bus 310, a processor 320, a memory 330, and/or a communication interface 360. In some embodiments, computing module 300 may also include an input device 340 and/or an output device 350.

Bus 310 includes a path that permits communication among the components of computing module 300 or other devices. Processor 320 may include any type of single-core processor, multi-core processor, microprocessor, latch-based processor, and/or processing logic (or families of processors, microprocessors, and/or processing logics) that interprets and executes instructions. Processor 320 may include an application-specific integrated circuit (ASIC), an FPGA, and/or another type of integrated circuit or processing logic. Processor 320 may include or be coupled to a hardware accelerator, such as a GPU, a GPGPU, a Cell, a FPGA, an ASIC, and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, a magnetic and/or optical recording memory device and its corresponding drive (e.g., a hard disk drive, optical drive, etc.), and/or a removable form of memory, such as a flash memory.

Memory 330 may store instructions for execution by processor 320. The software instructions may be read into memory 330 from another computer-readable medium or from another device. The software instructions may cause processor 320 to perform processes described herein. Alternatively, hardwired circuitry (e.g., logic) may be used in place of, or in combination with, software instructions to implement processes described herein.

The operating system may include software instructions for managing hardware and software resources of computing module 300. For example, the operating system may include Linux, Windows, OS X, Android, an embedded operating system, etc. Applications and application data may provide network services or include applications, depending on the device in which the particular computing module 300 is found.

Communication interface 360 may include a transmitter and/or receiver (e.g., a transceiver) that enables computing module 300 to communicate with other components, devices, and/or systems. Communication interface 360 may communicate via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination thereof. Communication interface 360 may include a transceiver that converts baseband signals to radio frequency (RF) signals or vice versa and may include an antenna assembly.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

In some implementations, computing module 300 may also include input device 340 and output device 350. Input device 340 may enable a user to input information into computing module 300. Input device 370 may include, for example, a keyboard, a mouse, a pen, a microphone, a remote control, an audio capture device, an image and/or video capture device, a touch-screen display, and/or another type of input device.

Output device 350 may output information to the user. Output device 350 may include a display, a printer, a speaker, and/or another type of output device. Input device 340 and output device 350 may enable a user interact with applications executed by computing module 300. In the case of a "headless" device (such as a deployed remote camera), input and output is primarily through communication interface 360 rather than input device 340 and output device 350.

As described in detail below, computing module 300 may perform certain operations relating to bit rate adjustments based on a gaze area. Computing module 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Computing module 300 may include other components (not shown) that aid in receiving, transmitting, and/or processing data. Moreover, other configurations of components in computing module 300 are possible. In other implementations, computing module 300 may include fewer components, different components, additional components, or differently arranged components than depicted in FIG. 3. Additionally or alternatively, one or more components of computing module 300 may perform one or more tasks described as being performed by one or more other components of computing module 300.

Figure 4:
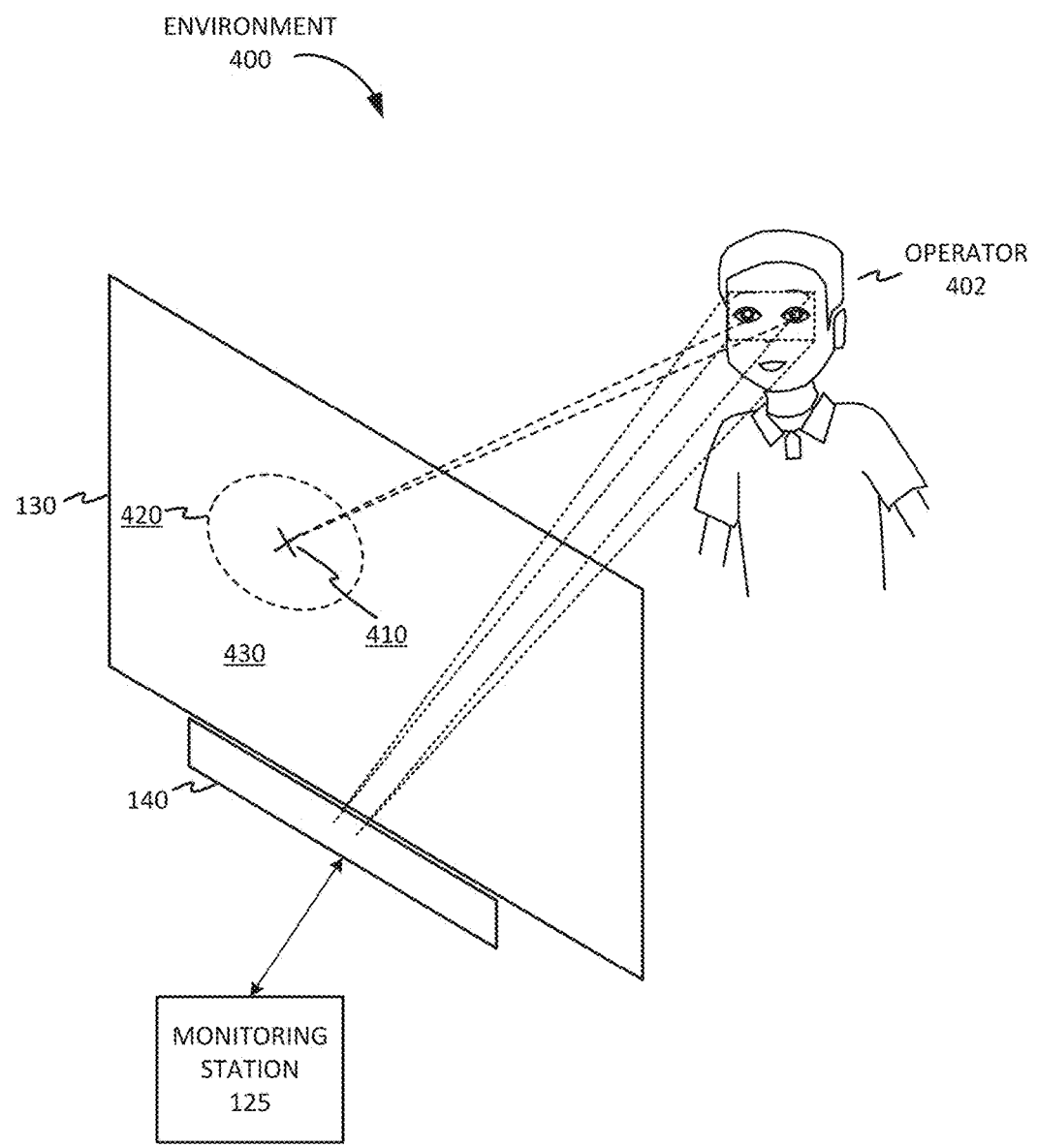
FIG. 4 illustrates an environment in which an operator views a display having an eye tracker according to an implementation described herein.

FIG. 4 illustrates an exemplary environment 400 of an operator 402 viewing display 130 having eye tracker 140 in an embodiment. Display 130 may include any type of display for showing information to operator 402. Operator 402 views display 130 and can interact with VMS 150 via an application running on monitoring station 125. For example, operator 402 may watch a video of area 106.

Eye tracker 140 includes a sensor (e.g., a camera) that enables monitoring station 125 to determine where the eyes of operator 402 are focused. In FIG. 4, for example, operator 402 sits in front of display 130 and the sensor in eye tracker 140 senses the eyes of operator 402. For example, eye tracker 140 may determine a gaze point 410, which may be represented as a location (e.g. pixel values associated with one or more pixels) on display 130. Based on the relative position of the operator and the display 130, a foveal vision area 420 (or "area 420") corresponding to the foveal vision of operator 402 may be estimated. Foveal vision corresponds to the detailed visual perception of the eye, and approximately subtends 1-2 spherical degrees. Accordingly, area 420 on display 130 may be calculated and understood to correspond to the part of operator's 402 vision with full visual acuity.

In an alternative embodiment, foveal vision area 420 may be determined experimentally during a setup procedure for a particular operator 402. Foveal vision area 420 is in contrast to peripheral vision area 430 outside of foveal vision area 420, which corresponds to the peripheral vision of operator 402. Gaze point 410 is approximately in the center of area 420 and corresponds to the line-of-sight from gaze point 410 to the eyes of operator 402. In an embodiment, information identifying gaze point 410 may be transmitted to VMS 150.

Figure 5A:
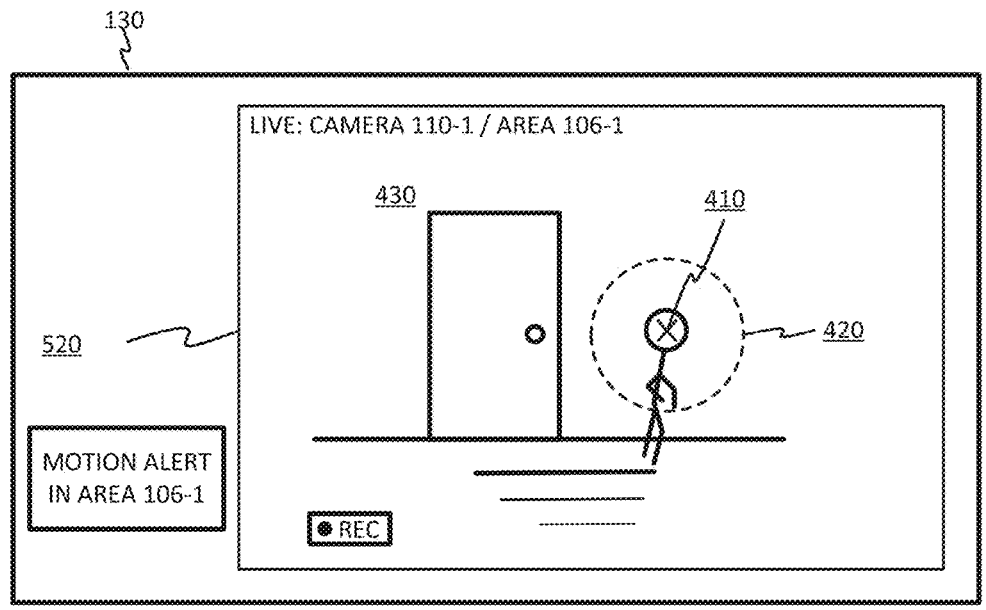
FIGS. 5A and 5B illustrate display from the perspective of an operator according to one or more implementations described herein.

FIG. 5A illustrates display 130 from the perspective of operator 402. As shown in FIG. 5A, display 130 includes gaze point 410, foveal vision area 420, and peripheral vision area 430. Display 130 also includes a video frame 520 in which a video stream is presented to operator 402. In this example, frame 520 shows a video stream from camera 110 of area 106, which happens to include a door and an individual who appears to be moving. Operator's 402 foveal vision area 420 encompasses the individual and gaze point 410 is directly on the individual's face. The door displayed in frame 520, on the other hand, appears in operator's 402 peripheral vision area 430.

In some implementations, the operator's gaze area may be designated as corresponding to foveal vision area 420. In other implementations, the operator's gaze area may be designated as corresponding to a different area based on gaze point 410 and foveal vision area 420. As an example, the operator's gaze area may be designated in size somewhere between the size of gaze point 410 and foveal vision area 420. As another example, the operator's gaze area may be designated as an area that is larger, and centered upon, foveal vision area 420.

Based on the designated gaze area, different actions may be triggered, so that the information generated by eye tracker 140 may be interpreted as a user input to the video management system. For example, if eye tracker 140-1 determines that operator 402 is viewing frame 520-1 showing the video stream from camera 110-1, then station 125-1, VMS 150, and/or camera 110-1 may reduce a bit rate for areas of the video stream associated with areas of frame 520 that are outside the operator's gaze area.

Figure 5B:
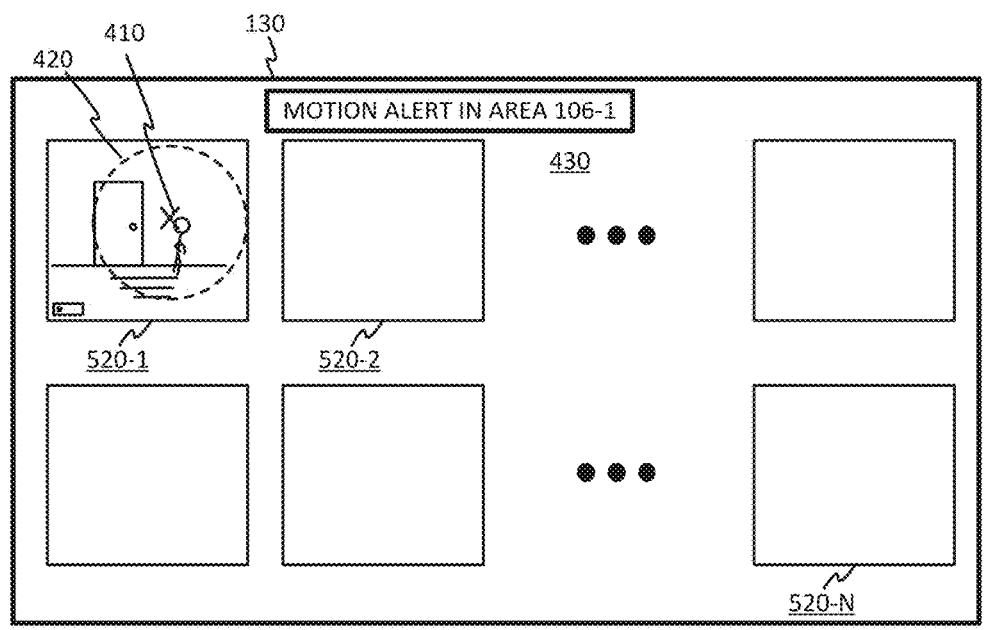

FIG. 5B also illustrates display 130 from the perspective of operator 402. In contrast to FIG. 5A, however, display 130 in FIG. 5B shows numerous frames 520-1 through 520-N (individually "frame 520"; or plural "frame 520"). Each frame 520-1 through 520-N may present a different video stream so operator 402 can monitor more than one area. The different streams may be produced by different cameras 110-1 through 110-M. In other embodiments, each frame 520-1 through 520-N may be displayed on a different display 130 arranged in front of the operator (e.g., on a wall, in an arc in front of the operator, etc.). Alternatively or additionally, each frame 520-1 through 520-N may display different streams generated by a common camera 110-x. For example, camera 110-x may use a "fisheye" lens and capture video from an extended angular area. The video may be processed to reduce distortions introduced by the fisheye lens, and separate the extended angular area into separate video streams corresponding to different areas, which may be separately presented in frames 520-1 through 520-N. As with FIG. 5A, display 130 in FIG. 5B includes gaze point 410, foveal vision area 420, and peripheral vision area 430.

In this example, frame 520-1 may show a video stream from camera 110-1 of area 106-1; video frame 520-2 may show a video stream from camera 110-2 of area 106-2; etc. Operator's 402 foveal vision area 420 in FIG. 5B encompasses the majority of frame 520-1 and gaze point 410 is close to the individual's face. The door displayed in frame 520 is also in foveal vision area 420. The other frames 520-2 through 520-N, on the other hand, are in operator's 402 peripheral vision area 430. The location of gaze point 410 and/or foveal vision area 420 may be used to select and/or designate a particular frame 520-x for subsequent processing which may be different from other frames 520. For example, as shown in FIG. 5B, gaze point 410 may be used to indicate that frame 520-1 is a frame of interest to the operator. Accordingly, the video monitoring system may allocate more resources to frame 520-1 (e.g., bandwidth and/or processing resources) to improve the presentation of the video stream in frame 520-1, and reduce resources allocated to other streams corresponding to frames which are not the focus (e.g., in the peripheral vision) of the operator.

Figure 6:
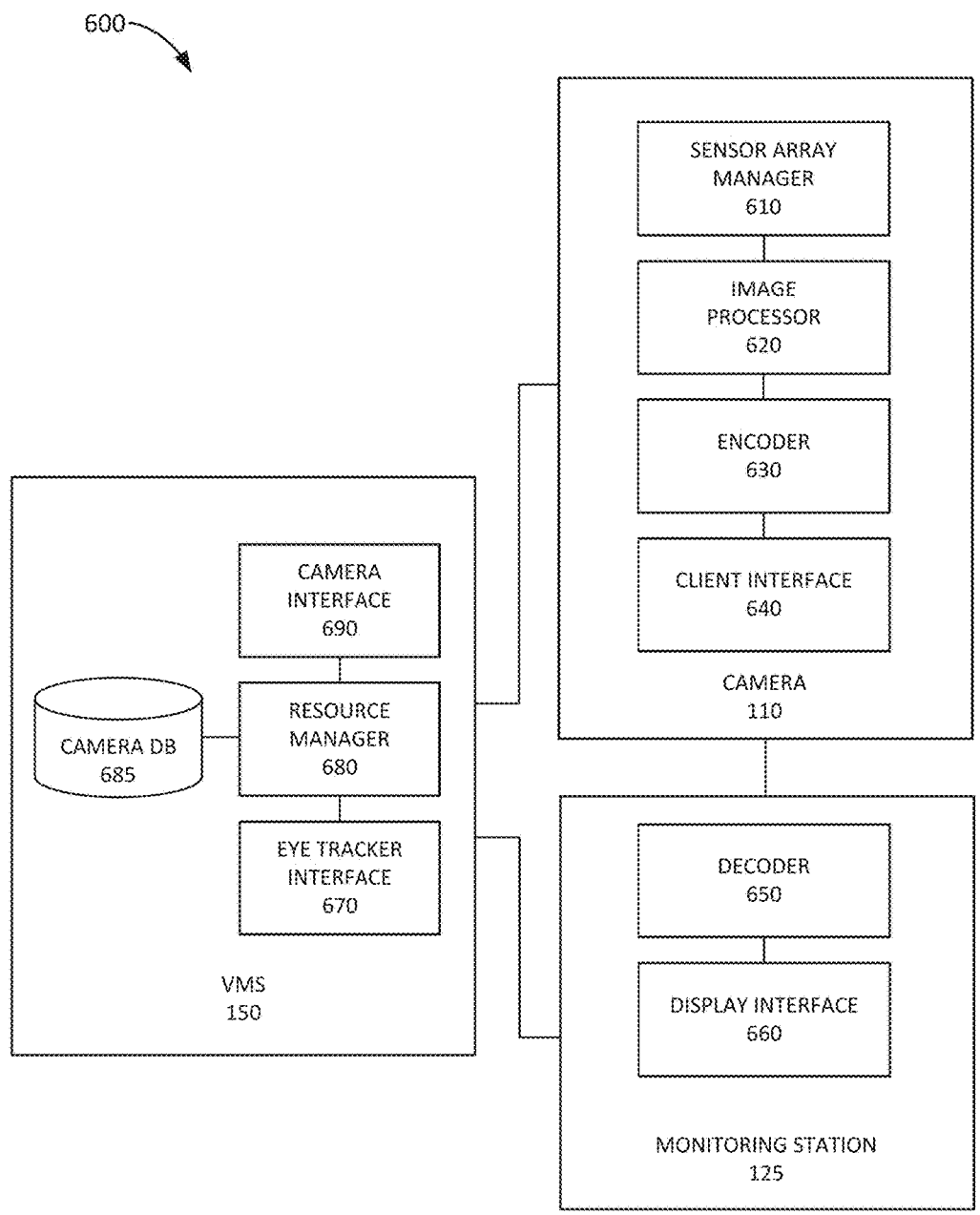
FIG. 6 is a diagram of functional components of some of the components of FIG. 1.

FIG. 6 is a diagram of functional components of camera 110, display 130, and VMS 150. The functional components of camera 110 may be implemented, for example, via controller 240 executing instructions stored in memory 245. Alternatively, some or all of the functional components included in camera 110 may be implemented via hard-wired circuitry. The functional components of display 130 and/or VMS 150 may be implemented, for example, via processor 320 executing instructions stored in memory 330. Alternatively, some or all of the functional components included in display 130 and/or VMS 150 may be implemented via hard-wired circuitry.

As shown in FIG. 6, camera 110 may include a sensor array manager 610, an image processor 620, an encoder 630, and a client interface 640; monitoring station 125 may include a decoder 650 and a display interface 660; and VMS 150 may include an eye tracker interface 670, a resource manager 680, a camera database (DB) 685, and a camera interface 690.

A video stream from camera 110 may follow the following processing path to display 130. Sensor array manager 610 directs sensor array 220 to capture a set of images for the video stream. Image processor 620 may perform image processing on the captured images, such as noise reduction operations and/or scaling operations. Encoder 630 may then compress the images using a codec such as, for example, MPEG-4. Client interface 640 may then encapsulate the encoded images into a container, such as, for example, MPEG-4 Part 14 (MP4) and may transmit the contained encoded images via data units across network 120 to monitoring station 125 for display on display 130. Decoder 650 may retrieve the encoded images from the container, may decode the images, and may provide the decoded images to display interface 660. Display interface 660 may store the decoded images in a buffer and may stream the decoded images from the buffer as a video stream on display 130.

Resource manager 680 may manage resources associated with environment 100. For example, resource manager 680 may manage network resources associated with transmission of data from cameras 110 to monitoring stations 125 and associated displays 130 across network 120, and/or processor and memory resources associated with cameras 110, monitoring stations 125, and/or displays 130. Resource manager 680 may instruct camera 110 to reduce a bit rate associated with a video stream from camera 110 to display 130 for a region of a video stream that is outside an operator's gaze area. Eye tracker interface 670 may be configured to communicate with eye tracker 140. For example, eye tracker interface 670 may obtain information identifying a gaze area associated with a particular video stream from eye tracker 140 using a particular Application Programming Interface (API) associated with eye tracker 140.

Resource manager 680 may collect gaze area information from eye trackers 140 via eye tracker interface 670, may determine one or more bit rate reduction factors based on information stored in camera DB 685, and may instruct one or more cameras 110 to apply the one or more bit rate reduction factors to one or more regions of a video stream. Camera DB 685 may store information relating to particular cameras 110. Exemplary information that may be stored in camera DB 685 is described below with reference to FIG. 7. Camera interface 690 may be configured to communicate with cameras 110 and may send instructions from resource manager 680 via a particular API associated with camera 110.

Sensor array manager 610 may store, manage, and/or apply one or more sensor array parameters. For example, sensor array manager 610 may store parameters governing whether a particular sensor in sensor array 220 should be turned on or off, a sampling rate for a particular sensor, a sensitivity factor for a particular sensor, and/or another type of sensor parameters. Moreover, sensor array manager 610 may store one or more setting for sensor array 220 to determine a type of image captured by sensor array 220. For example, a first setting may correspond to a regular image, a second setting may correspond to a wide angle or panoramic image, a third setting may correspond to a low light setting, etc. Sensor array manager 610 may receive an instruction from VMS 150 to adjust one or more of the stored parameters in order to adjust a bit rate in a region of sensor array 220 based on gaze area information determined by VMS 150.

Image processor 620 may store, manage, and/or apply one or more image processing parameters. For example, image processor 620 may store parameters relating to a noise reduction process, such as a low pass filter, parameters relating to a scaling process, and/or other types of image processing parameters that may be used to change a bit rate associated with a region of a video stream. Image processor 620 may receive an instruction from VMS 150 to adjust one or more of the stored parameters in order to adjust a bit rate in a region of a video stream based on gaze area information determined by VMS 150.

Encoder 630 may store, manage, and/or apply one or more encoding parameters, including intra-frame encoding parameters and inter-frame encoding parameters. For example, encoder 630 may store a quantization parameter (QP) for particular regions and/or objects of a video stream, store a set of coefficients for a discrete cosine transform (DCT), a Mean Absolute Difference (MAD) of Prediction Error parameter, and/or other encoding parameters. Encoder 630 may receive an instruction from VMS 150 to adjust one or more of the stored encoding parameters in order to adjust a bit rate in a region of a video stream based on gaze area information determined by VMS 150.

Client interface 640 may store, manage, and/or apply one or more image transmission parameters. For example, client interface 640 may store a Quality of Service (QoS) parameter. Client interface 640 may receive an instruction from VMS 150 to adjust one or more of the stored encoding parameters in order to adjust a bit rate in a region of a video stream based on gaze area information determined by VMS 150.

Although FIG. 6 shows exemplary functional components of camera 110, display 130, and VMS 150, in other implementations, camera 110, display 130, or VMS 150 may include fewer functional components, different functional components, differently arranged functional components, or additional functional components than depicted in FIG. 6. Additionally, any one of the components (or any group of components) of camera 110, display 130, and VMS 150 may perform functions described as performed by one or more other functional components of camera 110, display 130, and VMS 150.

Figure 7:
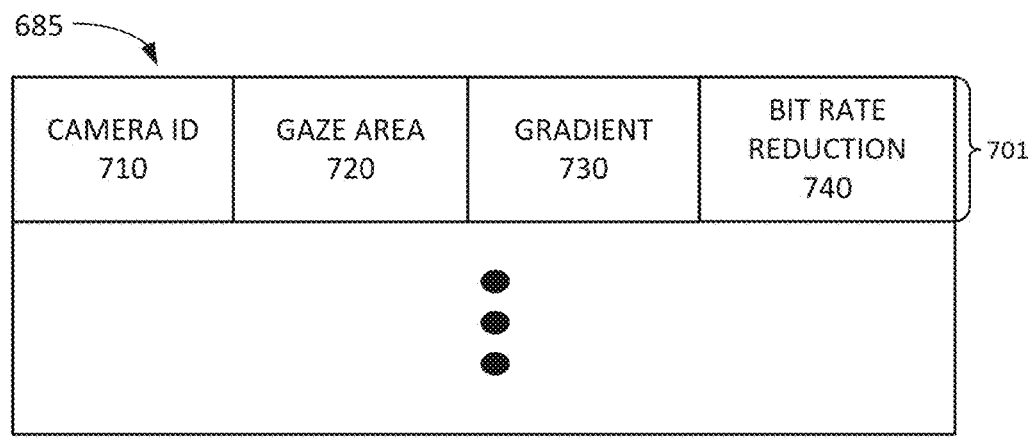
FIG. 7 is a diagram of exemplary components of the camera database of FIG. 6.

FIG. 7 is a diagram of exemplary components of the camera database of FIG. 6. As shown in FIG. 7, camera DB 685 may store one or more camera records 701. Each camera record 701 may store information relating to a particular camera 110. Camera record 701 may include a camera identifier (ID) field 710, a gaze area field 720, a gradient field 730, and a bit rate reduction field 740.

Camera ID field 710 may store one or more IDs associated with a particular camera 110. For example, camera ID may store a Media Access Control (MAC) address for the particular camera 110, an Internet Protocol (IP) address for the particular camera 110, a name assigned to the particular camera 110 by VMS 150, and/or another type of ID. Furthermore, camera ID field 710 may store make and model information for the particular camera 110 and/or a software version installed on the particular camera 110. Moreover, camera ID field 710 may include authentication information for the particular camera 110 that enables VMS 150 to establish a secure connection with the particular camera 110.

Gaze area field 720 may include information identifying a current or most recently identified gaze area for the particular camera 110. For example, gaze area field 720 may identify gaze point 410, foveal vision area 420, and/or another designated gaze area. Furthermore, gaze area field 720 may include historical information associated with the gaze area for the video stream associated with the particular camera 110. The historical gaze area information may be used, for example, to predict a gaze trajectory for the video stream associated with the particular camera 110.

Gradient field 730 may store information identifying a bit rate reduction factor gradient associated with the particular camera 110. For example, gradient field 730 may store a set of possible gradients and may store an indication identifying a chosen or active gradient from a set of possible gradients. The gradient may be defined by one or more bit rate reduction factors, such as a first bit rate reduction factor for a first region from an edge of the gaze area to a set distance from the edge of the gaze area, and a second bit rate reduction factor, higher than the first bit rate reduction factor, for a second region from the set distance to the edges of the display. As another example, a gradient may define a linearly decreasing bit rate reduction factor from an edge of the gaze area to the edges of the display. As yet another example, a gradient may define a nonlinearly decreasing bit rate reduction factor (e.g., an exponentially decreasing bit rate reduction factor, a logarithmically decreasing bit rate reduction factor, etc.).

Furthermore, gradient field 730 may include additional instructions and/or specifications for adjusting a bit rate. As yet example, gradient field 730 may specify that the bit rate should be decreased for the entire video stream if the gaze area falls outside the display. As another example, generating the gradient may include instructing the camera to increase a bit rate of the video stream inside the gaze area. As yet another example, gradient field 730 may specify to increase the bit rate in a region of reduced bit rate if a gaze trajectory indicates that the gaze area is moving into the region.

Bit rate reduction field 740 may identify one or more bit rate reduction factors that are to be applied in particular situations. Furthermore, bit rate reduction field 740 may identify one or more bit rate reduction factors that are currently being applied to a video stream associated with the particular camera 110. For example, bit rate reduction field 740 may identify one or more sensor array manager 610 parameters, one or more image processor parameters 620, one or more encoder parameters, and/or one or more client interface parameters 640. The encoder parameters may include different standard encoding profiles which can be adjusted to effect bitrate. For example, when using the H.264 video encoding standard, encoding profiles which may be selected include Baseline, Extended, Main, High, High 10, High 4:2:2, and High 4:4:4 Predictive. Additionally or alternatively, lower level encoding parameters may be adjusted to further adjust bitrate. For example, for MPEG encoding standards, the quantization scaling matrices may be selected to increase quantization to reduce the bit rates for encoded intra-frames. Moreover, change threshold levels may be adjusted to change compression rates for encoded inter-frames. For example, the threshold for movement may be raised when encoding P-frames and/or B-frames, and thus less changes are encoded which would lower the bitrate for an encoded video stream.

Figure 8:
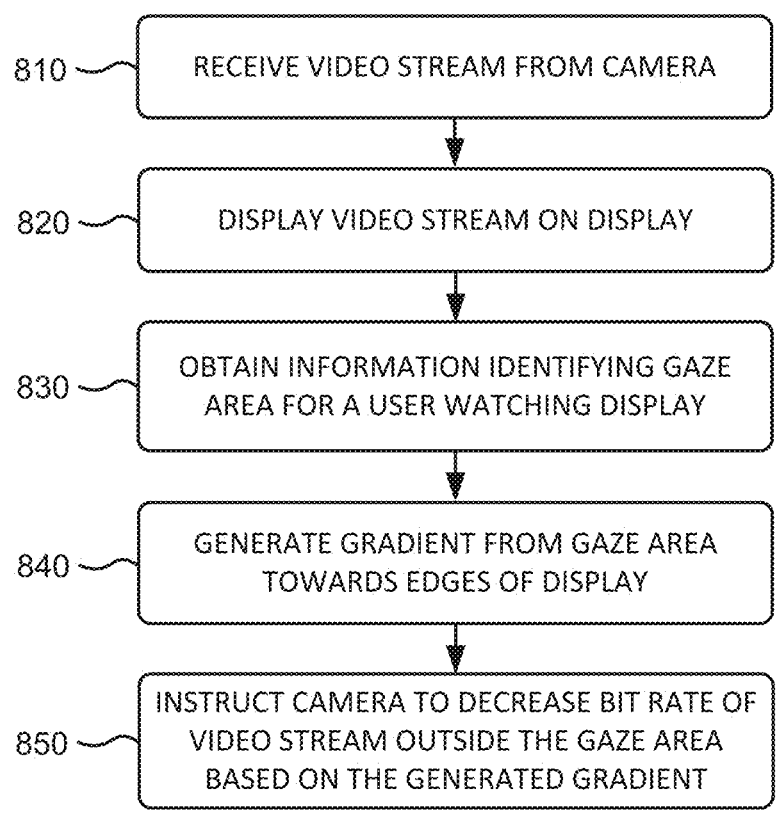
FIG. 8 is a flowchart of a process for controlling a bit rate based on a gaze area according to an implementation described herein.

FIG. 8 is a flowchart of a process for controlling a bit rate based on a gaze area according to an implementation described herein. In one implementation, the process of FIG. 8 may be performed by VMS 150. In other implementations, some or all of the process of FIG. 8 may be performed by another device or a group of devices separate from and/or including VMS 150, such as camera 110 and/or monitoring station 125.

The process of FIG. 8 may include receiving a video stream from a camera (block 810) and displaying the video stream on a display (block 820). For example, an operator may log into a computer device associated with monitoring station 125 and/or display 130 and may log into VMS 150 to configure one or more cameras 110. VMS 150 may configure camera 110 to provide a video stream of monitored area 106 to display 130 and display 130 may continue to receive video stream data from camera 110 and display the video stream data.

Information identifying a gaze area may be obtained for a user and/or an operator watching the display (block 830). For example, eye tracker 140 may monitor the user's eyes to determine gaze point 410 and/or foveal vision area 420 and determine the gaze area based on the determined gaze point 410 and/or foveal vision area 420. Information identifying the determined gaze area may be provided to resource manager 680 of VMS 150. Alternatively, raw data from eye tracker 140 may be provided to VMS 150 and VMS 150 may determine the gaze area based on the raw data.

A gradient may be generated from the gaze area towards the edges of the display (block 840). For example, resource manager 680 may generate a gradient for the video stream associated with camera 110. A particular gradient from gradient field 730 may be selected based on one or more parameters. As an example, a more conservative gradient (e.g., a linearly decreasing bit rate reduction factor from an edge of the gaze area towards the edges of the display) may be selected during times of low network load and a stricter gradient (e.g., applying a bit rate reduction factor to all regions outside the gaze area) may be selected during times of high network load. As another example, particular cameras 110 may be assigned importance ratings and a first camera 110 associated with a higher importance rating may be assigned a more conservative gradient that a second camera 110 associated with a lower importance rating. As yet another example, different users and/or monitoring stations 125 may be assigned importance ratings and a gradient may be selected based on the assigned importance rating.

The camera may be instructed to decrease the bit rate of the video stream outside the gaze area based on the generated gradient (block 850). For example, VMS 150 may select one or more bit rate reduction factors from bit rate reduction field 740 for the particular camera 110, such as a sensor array bit rate reduction factor, an image processing bit rate reduction factor, an encoding bit rate reduction factor, and/or an image transmission bit rate reduction factor. As an example, VMS 150 may select to adjust a sampling rate of a subset of sensors in sensor array 220 associated with a region of the video stream, to down-sample (e.g. lower the resolution) the region of the video stream, to increase a noise reduction process in the region of the video stream, to increase an encoding compression parameter, and/or to adjust another parameter that may result in a reduced bit rate in the region of the video stream.

A particular bit rate reduction factor may be selected based on one or more parameters. As an example, a bit rate reduction factor may be selected based on a make and model of the particular camera 110 associated with the video stream. As another example, the bit rate reduction factor may be selected based on a predicted bit rate reduction (e.g., based on historical data for the particular camera 110) and a bit rate reduction factor associated with the highest predicted bit rate reduction may be selected. As yet another example, the bit rate reduction factor may be selected based on a manual setting selected by the user. In another example, the bit rate reduction may be associated with the content of the scene and/or a detected object.

Figure 9A:
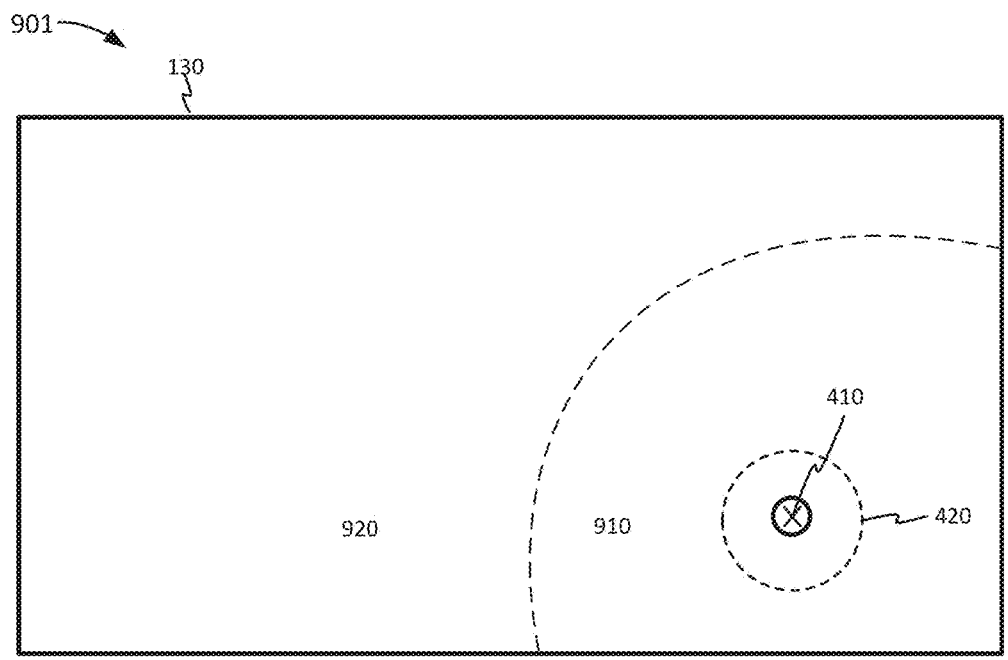
FIGS. 9A-9C are diagrams of exemplary bit rate reduction scenarios according to one or more implementations described herein.
Figure 9B:
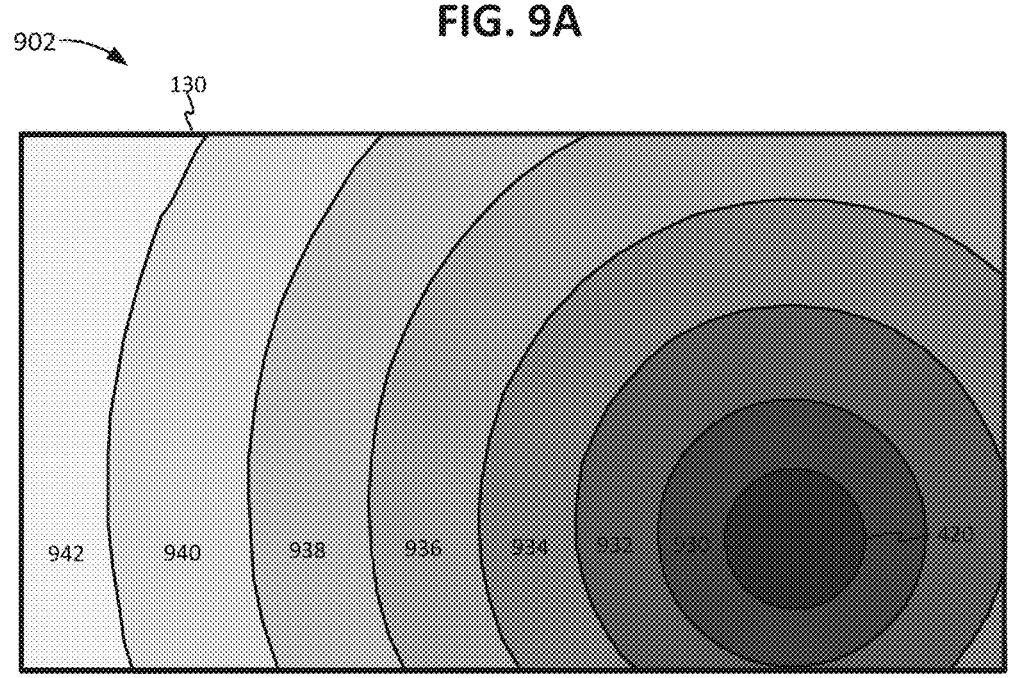
Figure 9C:
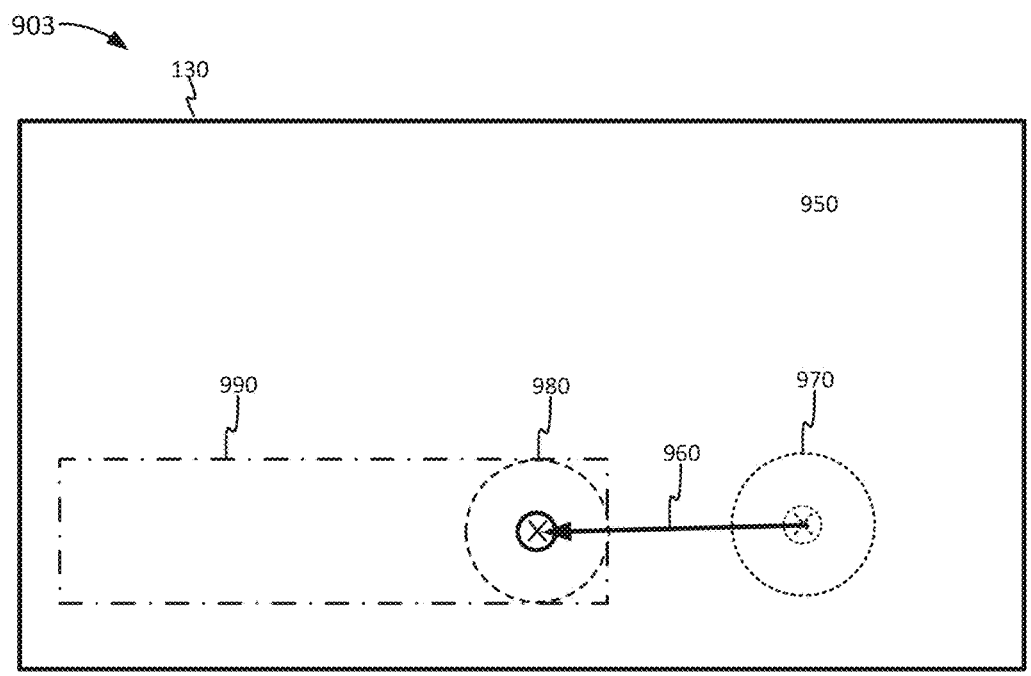

FIGS. 9A-9C are diagrams of exemplary bit rate reduction scenarios according to one or more implementations described herein. FIG. 9A illustrates a first exemplary bit rate reduction scenario 901 on display 130. As shown in FIG. 9A, the gaze area, designated as the foveal vision area 420, resides in the lower right corner of display 130. A gradient may be set with a first bit reduction area 910 and a second bit reduction area 920. First bit reduction area 910 may be defined as extending from the edge of foveal vision area 420 to a set distance. The set distance may be determined, for example, based on a peripheral vision area with a high likelihood of detecting motion. As another example, the set distance may correspond to a percentage of the distance from the edge of foveal vision area 420 towards the edge of display 130 (e.g., 30% of the distance to the edge, 50% of the distance to the edge, etc.). Second bit reduction area 920 may be defined as extending from the set distance further towards the edge of display 130.

First bit reduction area 910 may be associated with a first bit rate reduction factor and second bit reduction area 920 may be associated with a second bit rate reduction factor that is higher than the first bit rate reduction factor. Thus, second bit reduction area 920 may provide a low quality video stream at a low bit rate, first bit reduction area 910 may provide a video stream with a higher quality and bit rate, and foveal vision area 420 may provide a high quality video stream in which the bit rate has not been reduced from its nominal video compression rate. In some implementations, the bit rate inside foveal vision area 420 may be increased (e.g., by lowering a compression value, by reducing noise reduction, by increasing a sampling rate of a subset of sensors, etc.).

FIG. 9B illustrates a second exemplary bit rate reduction scenario 902 on display 130. As shown in FIG. 9A, the gaze area, designated as the foveal vision area 420, again resides in the lower right corner of display 130. A gradient may be set that includes a linearly increasing bit rate reduction factor from foveal vision area 420 toward the edges of display 130. Regions 930, 932, 934, 936, 938, 940, and 942 may be associated with increasing bit rate reduction factors and therefore decreasing bit rates and video quality.

FIG. 9C illustrates a third exemplary bit rate reduction scenario 903 on display 130. In scenario 903, the bit rate for area 950, outside foveal vision area 420, is reduced using a high bit rate reduction factor. After the bit rate is reduced, the gaze area begins to change as a trajectory 960 is established from previous gaze area 970 to current gaze area 980. Trajectory 960 may be used to predict a future trajectory of the gaze area as corresponding to region 990. In response, the bit rate reduction in region 990 may be removed by increasing the reduced bit rate back up to a high bit rate associated with the gaze area. Thus, the user's gaze may be anticipated as falling into region 990 and the bit rate may be increased in region 990 before the user's gaze reaches region 990. This may prevent any lag time or latency between when the operator's gaze falls on region 990 and when the user is able to view a high quality video stream in region 990. The trajectories may be predicted using tracking algorithms which store prior trajectories of gaze area 970, and may use statistical techniques to anticipate future changes in the movement of gaze area 970. In an embodiment, correlations between recognized objects in the video stream may influence the determination of the anticipated movement of gaze area 990. For example, objects of interest can be expected to attract the attention of the user, so the appearance of an object of interest, and/or trajectory of the object of interest, may influence the calculation of the predicted trajectory of gaze area 970.

This application incorporates by reference herein the following patent applications filed the same day as this patent application: U.S. Patent Application No. 15/395,893, titled "Gaze Heat Map," and filed Dec. 30, 2016; U.S. Patent Application No. 15/395,403, titled "Alarm Masking Based on Gaze in Video Management System," filed Dec. 30, 2016; and U.S. Patent Application No. 15/395,790, titled "Block Level Frame Rate Control Based on Gaze," filed Dec. 30, 2016.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 8, the order of the blocks may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software). The word "exemplary" as used herein means "as an example for illustration."

The terms "comprises" and "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by one or more computer devices, the method comprising:
receiving a video stream from a camera;
displaying the video stream on a display;
obtaining, via an eye tracking sensor, information identifying a gaze area for a user watching the display;
generating a gradient from the gaze area towards edges of the display; and instructing the camera to decrease a bit rate of the video stream outside the gaze area based on the generated gradient.

2. The method of claim 1, further comprising:
calculating a predicted gaze trajectory based on the obtained information; and
increasing the bit rate of the video stream along the predicted gaze trajectory.

3. The method of claim 1, further comprising:
determining that the gaze area falls outside the display; and
decreasing the bit rate for the entire video stream, in response to determining that the gaze area falls outside the display.

4. The method of claim 2, further comprising:
detecting a moving object in the video stream outside the gaze area; and
correlating the gaze area to the moving object.

5. The method of claim 1, wherein generating the gradient from the gaze area to edges of the display includes:
defining a first bit rate reduction factor for a first region from an edge of the gaze area to a particular distance from the edge of the gaze area, wherein the first bit rate reduction factor indicates an extent by which a bit rate for the first region is reduced; and
defining a second bit rate reduction factor for a second region from the particular distance to the edges of the display, wherein the second bit rate reduction factor indicates an extent by which a bit rate for the second region is reduced, wherein the second bit rate reduction factor is higher than the first bit rate reduction factor.

6. The method of claim 1, wherein generating the gradient from the gaze area to edges of the display includes:
defining a linearly decreasing bit rate reduction factor from an edge of the gaze area towards the edges of the display, wherein the bit rate reduction factor at a particular location of the display indicates an extent by which a bit rate at the particular location is reduced.

7. The method of claim 1, wherein instructing the camera to decrease a bit rate of the video stream outside the gaze area based on the generated gradient includes:
instructing the camera to reduce a sampling rate for a sensor associated with an area of the video stream outside the gaze area.

8. The method of claim 1, wherein instructing the camera to decrease a bit rate of the video stream outside the gaze area based on the generated gradient includes:
instructing the camera to lower resolution for an area of the video stream outside the gaze area prior to encoding the video stream.

9. The method of claim 1, wherein instructing the camera to decrease a bit rate of the video stream outside the gaze area based on the generated gradient includes:
instructing the camera to increase a noise reduction process for an area of the video stream outside the gaze area prior to encoding the video stream.

10. The method of claim 1, wherein instructing the camera to decrease a bit rate of the video stream outside the gaze area based on the generated gradient includes:
instructing the camera to increase a compression parameter value for an encoding processing unit associated with an area of the video stream outside the gaze area.

11. The method of claim 1, wherein the video stream includes a plurality of video streams and wherein the display includes a plurality of displays.

12. A computer device comprising:
a memory storing instructions; and
a processor configured to execute the instructions to:
receive a video stream from a camera;
display the video stream on a display;
obtain, via an eye tracking sensor, information identifying a gaze area for a user watching the display;
generate a gradient from the gaze area to edges of the display; and
instruct the camera to decrease a bit rate of the video stream outside the gaze area based on the generated gradient.

13. The computer device of claim 12, wherein the processor is further configured to execute the instructions to:
calculate a predicted gaze trajectory based on the obtained gaze information; and
increase the bit rate of the video stream along the predicted gaze trajectory.

14. The computer device of claim 12, wherein, when generating the gradient from the gaze area to edges of the display, the processor is further configured to:
define a first bit rate reduction factor for a first region from an edge of the gaze area to a particular distance from the edge of the gaze area, wherein the first bit rate reduction factor indicates an extent by which a bit rate for the first region is reduced; and
define a second bit rate reduction factor for a second region from the particular distance towards the edges of the display, wherein the second bit rate reduction factor indicates an extent by which a bit rate for the second region is reduced, wherein the second bit rate reduction factor is higher than the first bit rate reduction factor.

15. The computer device of claim 12, wherein, when generating the gradient from the gaze area to edges of the display, the processor is further configured to:
define a linearly decreasing bit rate reduction factor from an edge of the gaze area towards the edges of the display, wherein the bit rate reduction factor at a particular location of the display indicates an extent by which a bit rate at the particular location is reduced.

16. The computer device of claim 12, wherein, when instructing the camera to decrease a bit rate of the video stream outside the gaze area based on the generated gradient, the processor is further configured to:
instruct the camera to reduce a sampling rate for a sensor associated with an area of the video stream outside the gaze area.

17. The computer device of claim 12, wherein, when instructing the camera to decrease a bit rate of the video stream outside the gaze area based on the generated gradient, the processor is further configured to:
instruct the camera to lower resolution for an area of the video stream outside the gaze area prior to encoding the video stream.

18. The computer device of claim 12, wherein, when instructing the camera to decrease a bit rate of the video stream outside the gaze area based on the generated gradient, the processor is further configured to:
instruct the camera to increase a noise reduction process for an area of the video stream outside the gaze area prior to encoding the video stream.

19. The computer device of claim 12, wherein, when instructing the camera to decrease a bit rate of the video stream outside the gaze area based on the generated gradient, the processor is further configured to:
instruct the camera to increase a compression parameter value for an encoding processing unit associated with an area of the video stream outside the gaze area.

20. A system comprising:
a camera configured to:
  generate a video stream; and
a computer device configured to:
  receive the video stream from the camera;
  display the video stream on a display;
  obtain, via an eye tracking sensor, information identifying a gaze area for a user watching the display;
  generate a gradient from the gaze area to edges of the display; and
  send an instruction to the camera to decrease a bit rate of the video stream outside the gaze area based on the generated gradient; and
wherein the camera is further configured to:
  decrease the bit rate of the video stream outside the gaze area based on the received instruction.

* * * * *